United States Patent [19]

Boehm et al.

[11] 4,218,022
[45] Aug. 19, 1980

[54] STRAW CHOPPER AND SPREADER ATTACHMENT FOR A COMBINE HARVESTER

[75] Inventors: Ernst Boehm, Dingolfing; Heinz Eder, Aufhausen, both of Fed. Rep. of Germany

[73] Assignee: Gebr. Eicher G.m.b.H., Isar, Fed. Rep. of Germany

[21] Appl. No.: 24,755

[22] Filed: Mar. 28, 1979

Related U.S. Application Data

[63] Continuation-in-part of Ser. No. 957,114, Nov. 2, 1978, abandoned.

[30] Foreign Application Priority Data

Nov. 2, 1977 [DE] Fed. Rep. of Germany ....... 2749046

[51] Int. Cl.² .............................................. B02C 18/22
[52] U.S. Cl. .................................. 241/101.7; 241/222; 241/243
[58] Field of Search ...................... 241/101.7, 221–225, 241/243; 414/518; 239/679, 68

[56] References Cited

U.S. PATENT DOCUMENTS

| | | | |
|---|---|---|---|
| 2,670,775 | 3/1954 | Elofson | 241/101.7 X |
| 2,865,416 | 12/1958 | Hetteen | 241/243 X |
| 3,256,026 | 6/1966 | Elofson | 241/222 X |
| 3,350,017 | 10/1967 | Howell et al. | 241/190 X |
| 3,380,502 | 4/1968 | Grönberg | 241/224 |

*Primary Examiner*—Howard N. Goldberg
*Attorney, Agent, or Firm*—Robert L. Farris

[57] ABSTRACT

A straw chopping and spreading device consisting of a rotary chopper, mounted in a housing assembly and a spreader assembly 16 through which chopped straw passes out of the housing assembly. The spreader assembly consists of a pair of converging plates which form a converging nozzle, a series of adjustable spreader plates for controlling the width of spread and an adjustable deflector for adjusting the angle at which chopped straw is deflected toward the ground.

6 Claims, 3 Drawing Figures

STRAW CHOPPER AND SPREADER ATTACHMENT FOR A COMBINE HARVESTER

This is a Continuation-In-Part of copending application Ser. No. 957,114 filed Nov. 2, 1978, now abandoned.

TECHNICAL FIELD

The invention relates to a straw chopper and spreader attachment for an agricultural combine harvester which chops straw and spreads it in a wide path behind the harvester.

BACKGROUND ART

Straw choppers and spreaders currently used on combine harvesters normally have a chopped straw discharge and spreading arrangement like the arrangement disclosed in U.S. Pat. No. 3,350,017 to Howell et al. The chopper blades of the Howell et al straw chopper throw chopped straw to the rear and against the bottom side of a horizontal deflector plate. The horizontal deflector plate deflects chopped straw toward the ground. Generally vertical angled guide vanes on the bottom of the horizontal deflector plate direct straw outwardly to the sides of the straw chopper and spreader. The problems involved with this construction is that impingement of the chopped straw particles on the vertical angled guide vanes and on the bottom of the horizontal deflector plate removes a substantial portion of the kinetic energy from the straw. As a result, the chopped straw floats to the ground in a path that is narrower than desired unless the wind is blowing. A side wind can blow the limply falling straw into uncut crop where it may be picked up by the combine harvester a second time.

SUMMARY OF THE INVENTION

The straw chopper and spreader attachment of this invention includes two transverse plates positioned adjacent the chopper housing assembly outlet. These plates constitute a convergent duct through which chopped straw passes. Guide vanes of the same general size and shape as the cross section of the convergent duct are adjustably positioned in the convergent duct so as to spread the flow of the mixture of air and entrained straw pieces laterally outward or rearward as desired. A transverse extension flap is adjustably positioned adjacent the convergent duct to deflect the flow from the duct downwardly, if desired.

BEST MODE FOR CARRYING OUT THE INVENTION

Figure 1:
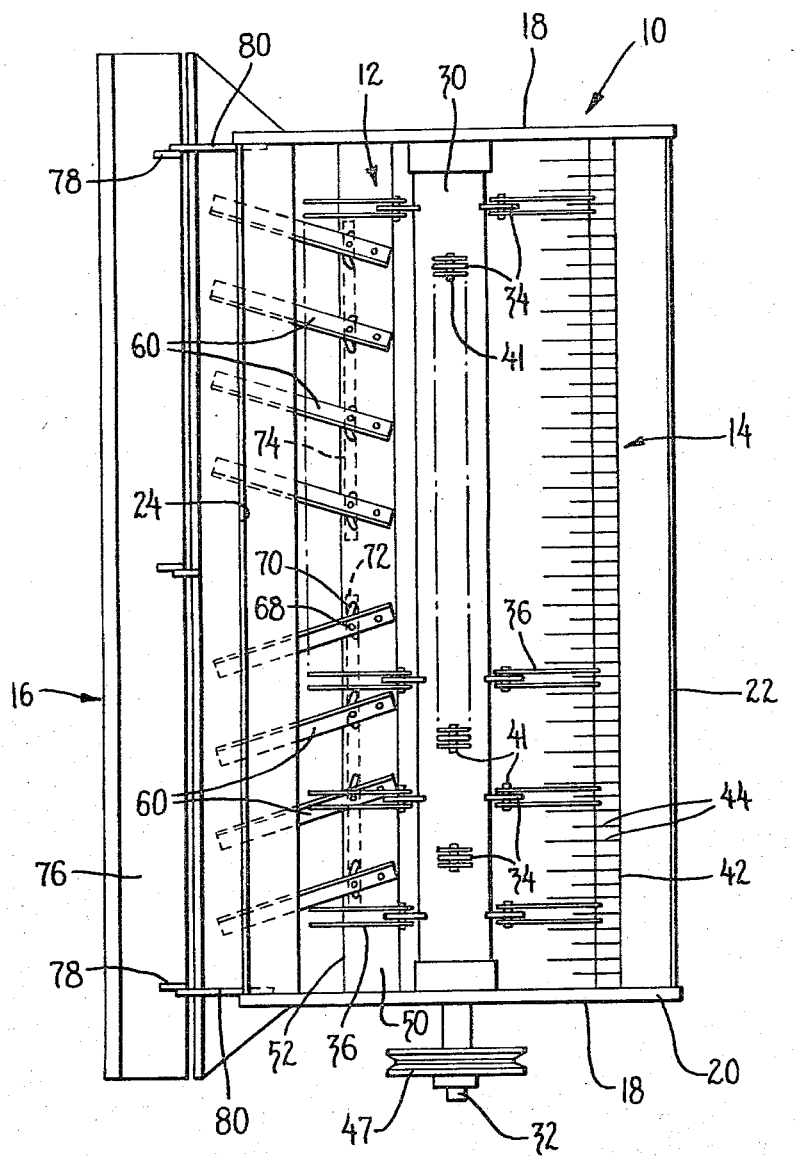
FIG. 1 is a plan view of straw chopper and spreader attachment.
Figure 2:
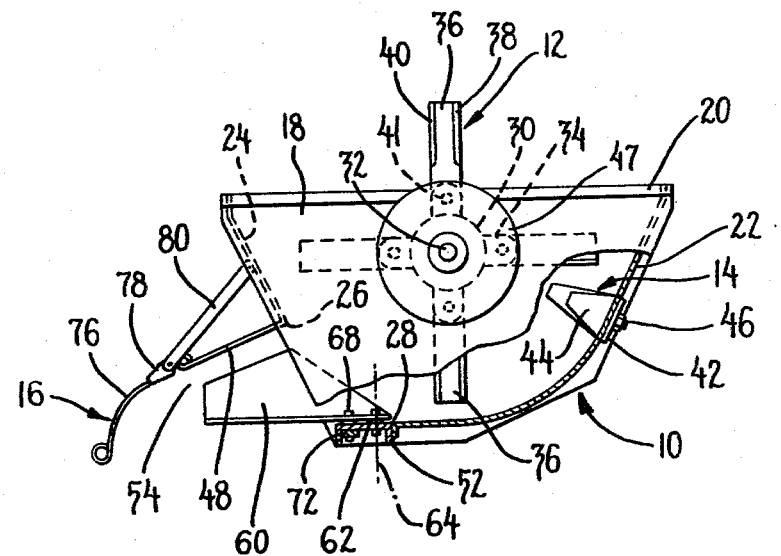
FIG. 2 is a side view of the straw chopper and spreader attachment.
Figure 3:
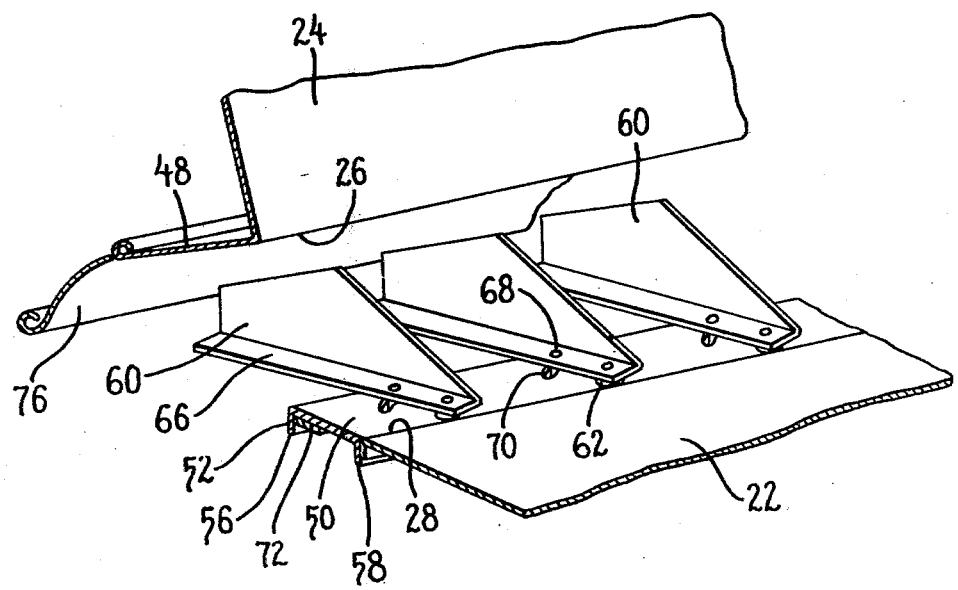
FIG. 3 is an enlarged perspective view of a portion of the spreader assembly with parts broken away.

The straw chopper and spreader attachment includes a steel sheet housing assembly 10, a chopper assembly 12 which cooperates with a row of stationary knives 14 and a spreader assembly 16. The steel sheet housing assembly 10 includes two end walls 18, a frame 20 on the upper edge of each end wall 18, a front and bottom wall 22 and a rear wall 24 which is also rigidly secured to the end walls 18. The frame 20 on each end wall 18 is adapted to be attached to the straw discharge outlet of an agricultural combine harvester. The bottom edge 26 of the rear wall 24, the two end walls 18 and the rear edge 28 of the front and bottom wall 22 define a chopped straw outlet in the steel sheet housing assembly 10.

The chopper assembly 12 includes a drum 30 with an integral shaft 32 rotatably journaled on each end wall 18. Four rows of flail attaching brackets 34 are welded to the outer surface of the drum 30. Flail knives 36 with a sharpened leading edge 38 and a sharpened trailing edge 40 are pivotally secured to the drum 30 by shafts 41 which passes through apertures in each row of flail attaching brackets 34 and through apertures in the flail knives 36.

At least one row of stationary knives 14 is mounted inside the steel sheet housing assembly 10 to cooperate with the flail knives 36 to chop straw. The row of stationary knives 14 includes a plurality of U-shaped blade members 42 with free leg portions 44 that project through slots in the front and bottom wall 22. The U-shaped blade members 42 are each secured in place by a bolt 46.

Drive pulley 47 is provided to rotate the drum 30 so that each flail knife 36 passes between two of the free leg portions 44 of the U-shaped blade members 42 to chop straw into short pieces. When the sharpened leading edge 38 of the flail knives 36 becomes dull, the flail knives 36 can be reversed so that the sharpened trailing edge 40 becomes the leading edge. The U-shaped blade members 42 can also be reversed, if desired.

The spreader assembly 16 includes an upper transverse plate 48 rigidly secured to the bottom edge 26 of the rear wall 24 of the steel sheet housing assembly 10 and extending from one end wall 18 to the other end wall 18. The upper surface 50 of a channel member 52 cooperates with the upper surface of the rear portion of the front and bottom wall 22 and the upper transverse plate 48 to form a convergent nozzel 54 through which air and chopped straw pass on their way out of the steel sheet housing assembly 10. The channel member 52 is rigidly secured to both end walls 18 and to the rear edge 28 of the front and bottom wall 26 with its free leg portions 56 and 58 extending downwardly. A plurality of guide plates 60 are pivotally secured to the channel member 52 by trunnions 62 for pivotal movement about generally vertical axes 64. Each of the guide plates 60 includes a generally vertical section which extends upwardly from the upper surface 50 of the channel member 52 to a point adjacent the upper transverse plate 48. A generally horizontal flange 66 extends outwardly from the vertical section of each guide plate 60 and forms an extension of the upper surface 50 of the channel member 52.

A pin 68 extends downwardly from each guide plate 60 and passes through an aperture 70 in the channel member 52. All of the pins 68 on one side of the straw chopper and spreader attachment are connected to an adjustment bar 72 positioned in the channel portion of the channel member 52. All of the pins 68 on the other side of the straw chopper and spreador attachment are connected to an adjustment bar 74 positioned in the channel portion of the channel members 52. The adjustment bars 72, 74 are moved parallel to the drum 30 to swing the guide plates 60 about their vertical axes 64. The adjustment bars 72, 74 are locked in any desired position relative to the channel member 52 to hold the guide plates 60 in the desired position.

A curved deflector plate 76 is pivotally attached to the lower rear edge of the upper transverse plate 48. A pair of arms 80 are pivotally attached to brackets 78 on the upper surface of the curved deflector plate 76 and to each end wall 18. By moving the point at which each arm 80 is attached to its adjacent end wall 18, the curved deflector plate 76 can be positioned to deflect chopper straw and air down toward the ground or to let chopped straw and air move rearwardly.

In operation, the straw enters the top of the steel sheet housing assembly 10 and is carried downwardly toward the stationary knives 14. The stationary knives 14 cooperate with the flail knifes 36 to chop straw into small pieces. The knives carry air and chopped straw past the stationary knives 14 and to the spreader assembly 16. The adjustment bars 72 and 74 are positioned to hold the guide plates 60 in a position which will give the desired width of spread to the straw. The curved deflector plate 76 is positioned to deflect chopped straw toward the ground or let the chopped straw move to the rear.

As the straw passes through the convergent nozzle 54 and past the guide plates 60, it is accelerated due to the decrease in the cross sectional area of the convergent nozzle 54. This acceleration of the chopped straw increases the width of distribution and improves the uniformity of distribution.

We claim:

1. A straw chopper and spreader attachment for an agricultural combine including a chopper housing, a rotatable chopper drum rotatably mounted within the chopper housing, an array of blades mounted on the rotatable chopper drum, an array of stationary cutter blades mounted within the chopper housing in cooperative relationship with the array of blades mounted on the rotatable chopper drum, and a spreader assembly secured to the chopper housing, the spreader assembly including upper and lower transverse plates which form a convergent duct for the passage of air and chopped straw and a plurality of guide vanes mounted within the convergent duct, each of said guide vanes including a substantially vertical section and a generally horizontal flange which cooperates with one of said transverse plates to form a portion of one wall of the convergent duct.

2. The straw chopper and spreader attachment for an agricultural combine of claim 1 wherein adjustment means are provided for adjusting the position of the guide vanes mounted within the convergent duct.

3. The straw chopper and spreader attachment for an agricultural combine of claim 1 wherein the guide vanes are pivotally mounted within the convergent duct for pivotal movement about generally vertical axes.

4. The straw chopper and spreader attachment for an agricultural combine of claim 3 including at least one adjustment assembly for pivoting two or more guide vanes about a vertical axes.

5. The straw chopper and spreader attachment for an agricultural combine of claim 1 wherein the spreader assembly includes a deflector plate adjustably secured to the chopper housing for changing the direction of movement of chopped straw after it passes through the convergent duct.

6. The straw chopper and spreader attachment for an agricultural combine of claim 1 wherein the deflector plate deflects straw toward the ground.

* * * * *